United States Patent [19]

Stayner

[11] 3,960,613
[45] June 1, 1976

[54] WAX-FLUX COMPOSITION CONTAINING AMINE SALTS OF CARBOXYLIC ACIDS FOR SOLDERING

[75] Inventor: Robert A. Stayner, Lafayette, Calif.

[73] Assignee: Chevron Research Company, San Francisco, Calif.

[22] Filed: Jan. 31, 1975

[21] Appl. No.: 545,870

[52] U.S. Cl. ................................... 148/23; 148/22
[51] Int. Cl.² .......................................... B23K 35/34
[58] Field of Search .............................. 148/22, 23

[56] References Cited
UNITED STATES PATENTS

| | | | |
|---|---|---|---|
| 2,672,479 | 3/1954 | Doerr | 148/23 |
| 2,898,255 | 8/1959 | Thompson | 148/23 |
| 2,978,369 | 4/1961 | Battle | 148/23 |
| 3,099,590 | 7/1963 | Laudenslager | 148/23 |
| 3,459,606 | 8/1969 | Becker | 148/23 |
| 3,832,242 | 8/1974 | Cuthbert | 148/23 |

*Primary Examiner*—P. D. Rosenberg
*Attorney, Agent, or Firm*—G. F. Magdeburger; C. J. Tonkin; J. T. Brooks

[57] ABSTRACT

Wax-flux compositions for use in low-temperature soldering processes comprise (A) a major amount of a wax and (B) an effective amount to cause fluxing, at or below the soldering temperature of the piece to be soldered, of a wax-soluble amine salt of an alpha-bromo aliphatic carboxylic acid. A process for soldering electrical components to a printed circuit board comprises (A) applying a molten wax-flux composition as described above to the metal pattern side of the board, (B) allowing the wax-flux composition to solidify, (C) trimming the components leads, and (D) soldering the components to the printed circuit board.

20 Claims, No Drawings

3,960,613

WAX-FLUX COMPOSITION CONTAINING AMINE SALTS OF CARBOXYLIC ACIDS FOR SOLDERING

BACKGROUND OF THE INVENTION

Field of the Invention

This invention relates to low-temperature soldering processes. This invention also relates to wax-flux compositions useful in such low-temperature soldering processes.

A commercially popular labor saving process for assembling electronic components is to install these components on a printed circuit board. After most, if not all, of the components are installed on the circuit board, the components are soldered into place by a process known as wave soldering.

One difficulty with the wave soldering process is that the components have leads which extend 1–2 inches beyond the surface of the printed circuit board. This long length requires a very high standing wave of solder. The standing wave can be forced high enough to solder these long lead components but this has disadvantages. Among them, a large amount of solder is lost in coating all these long leads and large globs of solder form between groups of leads which extend below the board. However, by soldering the printed circuit board prior to lead trimming, the components are fixed in place and can be trimmed by mechanical means rather than being hand trimmed, although hand-trimming, of course, is quite feasible.

The disadvantage of trimming a circuit board after it has been soldered is that critical applications, such as military or space applications require the circuit boards be resoldered subsequent to the trimming. This, of course, greatly increases the expense to the party doing the soldering as well as increases the risk of damage to the components.

An alternative to soldering the long leads is to hand trim them and bend the stubs over against the board before soldering. The bent-over stubs hold the components in place during the soldering operation. Advantages of this method are that only one soldering operation is required and only a low wave of solder need be maintained. The disadvantage is the large amount of hand labor required by this method.

What is needed is an inexpensive method which does not involve solder to fix the components in place on the circuitboard while the leads are being trimmed and which does not interfere with the subsequent soldering operation.

Wave soldering also uses a flux to clean the printed circuit board and prepare both the component leads and the printed circuit board foil to receive the solder. In a typical commercial installation, a liquid flux is maintained in a bath which contains fritted aspirators. Aspirating the liquid results in a foam head on the flux tank. The amount of aspiration is controlled so that the foam head just touches the printed circuit boards conveyed above it. A light film of the liquid flux is then deposited on the printed circuit board which subsequently passes over a heater. This preheats the circuit board. The printed circuit board immediately thereafter passes over the standing wave of solder and the soldering process is accomplished.

One disadvantage of using this method of applying the soldering flux to the parts which are to be soldered is that extra equipment is needed. In addition, the flux must be aspirated very carefully and constant attention must be paid to the machinery to see that the flux head remains at the right height. If the flux head is too low, obviously the printed circuit boards will not be properly treated and a poor soldering job will result. If the flux head is too high, the entire circuit board including the components may be coated with flux which requires additional cleaning as well as wastes soldering flux. What is needed is a convenient way to apply the soldering flux to the printed circuit board which does not require special equipment and special attention.

The present invention not only solves the problem of how to firmly fix the components to the printed circuit board for the lead-trimming operation, but also the problem of how to conveniently apply soldering flux to the printed circuit board all in a single-step operation.

SUMMARY OF THE INVENTION

A wax-flux composition for use in low-temperature soldering processes is provided comprising (A) a major amount of a wax and (B) an amount effective to cause fluxing, at or below the soldering temperature of the piece to be soldered, of a wax-soluble amine salt of an alpha-bromo aliphatic carboxylic acid. The hardness of the wax at room temperature is chosen to effectively hold the electronic components in place during an automatic lead-trimming operation. The amine salt provides fluxing action during the subsequent soldering step thereby obviating the need to separately apply a soldering flux.

DETAILED DESCRIPTION OF THE INVENTION

Wax-flux compositions for use in a low-temperature soldering process are provided comprising: (A) a major amount of a wax having an American Melting Point (AMP determined by ASTM D 127-60) between 40° and 100°C and (B) an amount effective to cause fluxing, at or below the soldering temperature of the piece to be soldered in said process, of a wax-soluble amine salt of an alpha-bromo aliphatic carboxylic acid. In a second embodiment of the invention a process is provided for soldering electrical components to a printed circuit board, said board comprising a non-conducting substrate and a pattern of an electrically conductive metal laminated to said substrate, said metal being solderable with a low-melting-point alloy solder, said board having component lead receiving holes through both said substrate and said metal pattern, comprising:

a. applying a molten wax-flux composition described above to the metal pattern side of said board and to said component leads;

b. allowing said wax-flux composition to solidify;

c. trimming said component leads; and d. soldering said component to said printed circuit board with a low-melting-point alloy solder.

The Wax

Suitable waxes for use in the wax-flux compositions of this invention and in the soldering processes of this invention include any wax or wax blend which is solid at room temperature and has a melting point below the temperature at which the soldering process will be conducted. Preferably the waxes have an AMP of at least 40°C and generally the waxes will have an AMP not greater than 100°C. Preferably the waxes have an AMP between 50° and 80°C.

Suitable waxes include petroleum-derived waxes such as the well known paraffin waxes, microcrystalline waxes, slack waxes, scale waxes, petrolatum, etc. These waxes are obtained from the processing of crude petroleum and are generally substantially saturated, substantially straight long-chain aliphatic hydrocarbons. Petroleum waxes suitable for use in this invention have AMP's within the range specified above.

Suitable wax blends for use in this invention include the hot melt coatings which consist of blends of petroleum waxes and polymers, copolymers or resins. Suitable materials which may be blended with the petroleum waxes include polymers of low molecular weight olefins, such as polymers of ethylene, propylene, butylene, isobutylene, and the like. Suitable polymers will have molecular weights from about 1,000 to about 1,000,000, more usually from about 1,000 to about 50,000. These are average molecular weights and generally a major portion of the molecules of the polymer will have molecular weights close to the average.

Suitable copolymers include copolymers of olefins with olefinic esters such as ethylene-vinyl acetate copolymers. These copolymers are commercially available from E. I. DuPont DeNemours & Company under the trade name ELVAX. Other suitable copolymers include copolymers of different olefins such as the copolymers of propene and butene. Typically such a copolymer will contain from about 15 to about 85 mol percent propene, more usually from about 25 to 75 mol percent propene. Typical copolymer molecular weights will range from about 1,000 to about 1,000,000, more usually from about 1,000 to about 300,000.

Other suitable wax blends include wax compositions incorporating cellulose esters or cellulose ethers. Suitable cellulose esters include alkyl esters of cellulose wherein the cellulose molecule contains, on the average, 3 alkyl radicals per glucose unit, i.e., the cellulose esters are triesters of cellulose. Typically, the alkyl radicals contain from about 7 to about 16 carbon atoms which include cellulose triheptanoate, cellulose trioctanoate, cellulose tridecanoate, cellulose trilaurate, etc.

Suitable cellulose ethers include the di- and triethers of cellulose wherein the ether radicals are hydrocarbon radicals, preferably alkyl radicals each having from 1 to 18 carbon atoms, with the combined total number of carbon atoms preferably being at least 12. In other words, although each of the hydrocarbon ether radicals on each glucose unit of the cellulose has from 1 to 18 carbon atoms, the total number of carbon atoms preferably is at least 12. In the case of diethers, one of the ether radicals preferably contains at least 8 carbon atoms. Suitable ethers of cellulose include cellulose methyl octyl ether, cellulose ethyl octyl ether, cellulose ethyl decyl ether, cellulose ethyl dodecyl ether, cellulose ethyl tetradecyl ether, cellulose propyl octyl ether, cellulose butyl octyl decyl ether, celulose methyl butyl amyl ether, cellulose tri(butyl) ether, cellulose methyl octyl octadecyl ether, etc.

Typically the cellulose, prior to etherification or esterification, has a molecular weight ranging from about 40,000 to about 500,000. Typically the cellulose esters and cellulose ethers are used in the wax compositions in amounts ranging from about 2 to about 30 percent, preferably from about 10 to about 20 percent by weight.

Suitable waxes for this invention also include waxes obtained from natural sources, such as animal, vegetable or insect sources. Suitable waxes include beeswax, carnuba wax, montan wax, wool wax, and the like.

Another type of wax suitable for use in this invention includes the well known Fischer-Tropsch waxes. Fischer-Tropsch waxes are waxes synthesized by the familiar Fischer-Tropsch process. By this process, coal is burned in the presence of oxygen and steam to produce hydrogen and carbon monoxide, which are then reacted in the presence of catalyst to make the desired hydrocarbon wax. Suitable Fischer-Tropsch waxes for this invention can be obtained under the trade name "Paraflint". These particular Fischer-Tropsch waxes have a high molecular weight, on the average in the range of about 750 to 1000 and generally consist essentially of straight-chained hydrocarbons.

Although the above waxes have been mentioned individually suitable waxes for this invention include mixtures of various proportions of the above-mentioned waxes.

The Fluxing Agent

The wax-flux compositions provided by this invention and useful in the process of this invention include a wax-soluble amine salt of an alpha-bromo aliphatic carboxylic acid. The fluxing agent cleans the surface to be soldered and prepares it to receive the solder. Preferably the fluxing agent becomes highly active at elevated temperatures, for example, at or slightly below the soldering temperature. However, the fluxing agent should be substantially passive and non-labile at the normal operating temperatures of the equipment manufactured from the pieces which are to be soldered.

Fluxing agents which have been found to exhibit the necessary activity at elevated temperatures and yet passivity at normal operating temperatures include amine salts of alphabromo-aliphatic carboxylic acids. In general, the amine salt can be prepared from any aliphatic carboxylic acid which contains 6 or more carbon atoms and which is substituted in the position alpha to the carboxylic group with a bromine. The amine portion of the amine salt should be a primary or secondary amine containing 6 or more carbon atoms distributed between the amino substituents. The presence of 6 or more carbon atoms in each of the amine and the carboxylic acid moieties of the amine salt insures wax solubility and substantial water insolubility of the fluxing agent thereby allowing the wax-flux composition to pass stringent water resistivity tests.

The aliphatic carboxylic acid from which the amine salt is prepared can be obtained from naturally occurring or synthetic sources. Suitable carboxylic acids, as mentioned above, contain 6 or more carbon atoms and generally contain not more than 22 carbon atoms. Examples of suitable acids include hexanoic acid, octanoic acid, decanoic acid, lauric acid, myristic acid, palmitic acid, stearic acid, eicosanoic acid, and docosanoic acid and the like. All the above-mentioned acids are substantially straight chain aliphatic carboxylic acids. Suitable acids also include corresponding aliphatic carboxylic acids containing 1 to 2 sites of olefinic unsaturation such as oleic acid. In addition, saturated and unsaturated branched chain aliphatic carboxylic acids of the requisite carbon content are suitable. For example, a suitable acid includes isostearic acid.

A bromine substituent can be introduced into the alpha position of these carboxylic acids conveniently by the Hell-Volhard-Zelinski reaction. In this well-known reaction, the elemental halogen, in this case bromine, is caused to substitute exclusively at the alpha position of the acid by the presence of a small amount of phosphorus, generally introduced in the form of a phosphorus halide such as phosphorus trichloride or phosphorus tribromide.

Subsequent to obtaining the bromine-substituted carboxylic acid, it may be decolorized, if necessary, by contacting it with a suitable material such as activated charcoal or the like. Decolorizing may only be necessary if the specification for the wax-flux compositions contains a color requirement.

The amine moiety of the amine salt can be obtained from naturally occurring or synthetic sources. As mentioned above, it should generally contain at least 6 carbon atoms to provide wax solubility and water insolubility. Suitable amines include dipropylamine, dibutylamine, dihexylamine, octylamine, dioctylamine, N,N-di-(2-ethylhexyl) amine, decylamine, didecylamine, octadecylamine, dioctadecylamine, and the like. The amino substituents in addition to being saturated as in the examples above can include unsaturated substituents such as in oleylamine and di-oleylamine. Other naturally occurring materials which are suitable include the amino derivatives of coconut oils such as di-cocoamine. The hydrocarbyl portions of the cocoamine derivatives are a mixture of hydrocarbyls, generally straight chain, of which usually 60 percent or more contain 12 to 14 carbon atoms.

The primary and secondary amines used to prepare the amines salts used in the flux compositions of this invention are generally available commercially. The preferred amine to be used in preparing the activator agent of this invention is N,N-di-(2-ethylhexyl) amine.

The amine salt is prepared from the above described amines and the alpha-bromo-aliphatic carboxylic acids by simply combining the two materials either neat or in the presence of a solvent. If the amine salt does not form at room temperature, the mixture may be warmed slightly to cause the salt to form. However, the temperature should be kept below that at which the amide forms as indicated by formation of water. In general, the amine/acid mixture need not be heated above 50°–60°C. To prevent excessive coloration of the amine salt, it is often desirable to use a solvent. Suitable solvents include lower alkanes such as pentane, hexane, heptane, octane and the like as well as the chlorinated hydrocarbons and lower molecular weight alcohols. It is often desirable to choose a solvent having a boiling point at or below the maximum temperature to which the amine/acid mixture may be brought without formation of the amide.

Preferably, the amine salts used in the wax-flux compositions of this invention have the following formula

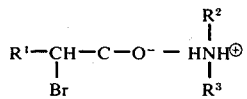

wherein (a) $R^1$ represents a hydrocarbyl containing 4 to 20 carbon atoms, preferably 12 to 18 carbon atoms and 0 to 2, preferably 0 to 1 sites of olefinic unsaturation, and (b) $R^2$ and $R^3$ each independently represent hydrogen or a hydrocarbyl such that the sum of the carbon atoms contained in $R^2$ and $R^3$ is between 6 and 40. Preferably, $R^2$ and $R^3$ each independently represent hydrogen or a hydrocarbyl containing 3 to 16 carbon atoms, preferably 6 to 10 carbon atoms such that the sum of the carbon atoms contained in $R^2$ and $R^3$ is between 6 and 32, preferably between 6 and 20.

The Wax-Flux Compositions

The wax-flux compositions of this invention are prepared by melting the wax or wax blend and dissolving the amine salt therein. The mixture is then stirred until homogeneity is obtained. The wax-flux composition is cast into blocks or slabs and allowed to solidify unless it is to be immediately used.

The wax-flux compositions of this invention will contain an amount effective to cause fluxing, at or below the soldering temperature of the piece to be soldered, of the wax-soluble amine salt. This effective amount can readily be determined by those skilled in the art by a few simple soldering tests to determine the minimum amount necessary. Any amount above the minimum necessary to cause effective fluxing generally is not necessary and increases the cost of the wax-flux composition without additional benefits during the soldering process. Typically, the wax-flux compositions will contain from about 1 to about 20 weight percent of the amine salt, more usually from about 3 to about 12 weight percent and preferably from about 5 to about 10 weight percent.

The Process

The wax-flux compositions of this invention are useful in the soldering process of this invention. The soldering process for this invention provides a method for soldering electrical components to a printed circuit board. Printed circuit boards are well known in the art. They consist of a non-conducting substrate and a pattern of an electrically conductive metal laminated to the substrate. Typically, the substrate is a phenolic resin or an epoxy fiberglass composition board. Almost universally the electrically conductive metal is a copper foil. The pattern of the conductive metal on the substrate can be prepared by a number of means well known to those skilled in the art.

The printed circuit board has lead receiving holes. The electrical component leads are inserted through the holes from the non-pattern side of the board. Typically, the electrical components have leads which extend 1 to 2 inches beyond the pattern side of the board. In some prior art methods of soldering the components to the board, the leads are soldered to the metal pattern and then the lead is trimmed relatively close to the board.

The process of this invention is particularly applicable to automated soldering with wave soldering machines. Wave soldering machines are commercially available from a number of sources and are used by most of the electronics industry manufacturers. As mentioned above, a particularly troublesome problem in trying to solder electric components to printed circuit boards with wave soldering machines is the long leads of the electronic components which extend beyond the board.

In the process of this invention, the component leads are inserted through the holes of the printed circuit board. Then without trimming the leads, the molten wax-flux composition is applied to the metal pattern side of the circuit board and allowed to solidify. Once the wax-flux composition has solidified, the components are firmly attached to the board and the component leads can be trimmed prior to the soldering operation.

The component leads of the waxed board can be trimmed by any available method including hand-trimming and automated trimming. A most convenient method of trimming uses a high-speed circular metal-cutting saw. One example of such a saw is a 16-inch high-speed circular saw sold by Hollis Engineering Company of Nasha, New Hampshire under the name Holli-Cutter. To use the Holli-Cutter, the printed circuit board is placed on a conveyer which passes over the circular saw. The space between the printed circuit board and the saw blade is adjusted to give trimmed leads of the desired length.

After the leads are trimmed, the electrical components are soldered to the printed circuit board with a low-melting-point alloy solder. This soldering operation can be conducted by any of the conventionally available means such as by hand-soldering or by automated wave soldering.

In a preferred embodiment of the process, the wax-flux composition is applied to the printed circuit board by contacting the metal pattern side of the board with the crest of a standing wave of molten wax-flux composition. Thereafter the wax-flux composition is allowed to solidify, generally with the aid of a forced draft of cold air. The component leads are then trimmed by an automated cutting means which is placed in line with the conveyer carrying the printed circuit board. Thereafter the components are soldered to the board by contacting the metal pattern side of the board with the crest of a standing wave of the low-melting-point alloy solder, typically, in one of the commercially available automated wave soldering machines.

When a wave soldering machine is used, it is often found advantageous to maintain a thin film of tinning oil over the surface of the standing pool of molten solder in the catch basin of the wave soldering machine. The tinning oil helps reduce oxidation and dross formation of the molten solder which can lead to poor soldering. Suitable tinning oils are available commercially. One such tinning oil is available from Hollis Engineering Company and comprises a bright stock containing fats, fatty acids, naturally occurring unsaturated long-chain acids, and oxidation inhibitors.

Typically, the tinning oil is changed approximately every 8 hours. In the process of this invention, the tinning oil becomes contaminated with the wax-flux composition which melts and is removed from the printed circuit board during the soldering operation. It has been found such a small quantity of wax-flux composition is coated onto each board, that even with a very high soldering rate, the wax-flux composition contamination of the tinning oil does not cause a significant reduction in the useful life of the oil. This slight increase in the frequency of changing the tinning oil is a very small price to pay for the convenience and improved soldering offered by the process of this invention.

Subsequent to the soldering process, any remaining traces of the flux are generally removed from the printed circuit board. This prevents potential long-term corrosion of the printed circuit board and the component leads.

The flux and tinning oil can be removed either by vapor degreasing or aqueous washing. Machines are available commercially for practicing both methods. For aqueous washing, these generally resemble large dishwashers. Typically, the wash water is maintained between 60°C and 72°C. Generally a detergent is used during the washing process. Typical detergents are mixtures of alkaline surface-active agents and nonionic surface active agents. Suitable commercially available detergents include Aqua-Clean available from Hollis Engineering Company and Lonco-Terge available from Lonco Corporation.

As a final step of the washing process the circuit boards are rinsed with warm or hot deionized or distilled water to remove the last traces of the fluxing agent and the detergents.

The following example is included to further illustrate the invention.

EXAMPLE

Wax-flux compositions of this invention are tested in commercially available wave soldering equipment. The results of these tests are compared against soldering operations conducted in commercially available wave soldering equipment using a commercially available wave soldering flux, namely Alpha Reliafoam 809 Flux available from Alpha Metals, Inc., 56 Water Street, Jersey City, N.J. 07304. This flux is one of the most widely used commercially available liquid fluxes for wave soldering. It has been found to have the capacity to satisfactorily flux copper printed circuit boards having visible dirt, tarnish and corrosion.

For soldering sample printed circuit boards using the commercially available Alpha flux, the wave soldering equipment comprises an in-line unit having a foam flux applicator, a preheater, and a wave solder applicator. The in-line unit includes a conveyor which transports the boards through the various steps of the soldering operation. Printed circuit boards for the soldering operation are prepared by inserting the leads of electronic components through the holes in the printed circuit board, trimming the leads, and bending the stubs over against the copper foil. The printed circuit boards used in these tests are deliberately prepared to be dirty, tarnished and difficult to solder.

For soldering printed circuit boards using the wax-flux composition of this invention the wave soldering equipment includes a wax-flux applicator in which the molten wax-flux composition at about 75°–95°C is pumped into a standing wave about 4–5 cm in height. Next in line is a lead trimmer which is, in this case, a Holli-Cutter available from Hollis Engineering, Inc. The Holli-Cutter comprises a 16-inch high-speed tungsten carbide-tipped circular saw. After the lead trimmer is the board preheater and then the wave solder applicator. The leads of electronic components are inserted through the holes in the printed circuit board. The leads are left untrimmed. The board with the eleectronic components is placed on the conveyer of the soldering apparatus. The printed circuit board is conveyed first over the wax-flux wave. A thin film of wax-flux remains on the underside of the printed circuit board. The board then passes over a forced draft of cool air which cools and solidifies the wax. The board then passes over the lead trimmer and the electronic component leads are trimmed to the desired length. The board then passes over the flux preheater and over the wave of solder. The printed circuit boards soldered with the wax-flux composition of this invention and according to the process of this invention are then compared with the printed circuit boards soldered using the commercially available liquid flux.

The wax-flux composition comprises 80% weight refined base wax having an AMP of 154/156, 10% weight of the Di-(2-ethyl hexyl) amine salt of alpha-bromo-isostearic acid, and 10% weight of a polyoxyethylene (2) stearyl ether available commercially as BRIJ 72 from Atlas Chemical Industries, Inc. The wax-flux composition securely attaches the electronic components to the printed circuit board and allows fully satisfactory automated lead trimming. During the soldering step this wax-flux composition provides fluxing and allows soldering comparable to the commercially available soldering flux. A certain amount of dewetting is noted when the soldering wave contains no tinning oil.

Subsequent to the soldering step, the printed circuit board is washed in a circuit board washer using 71°C aqueous detergent solution containing Hollis Aqua-Clean. The washed boards are completely clean and free of any wax or oil residue.

What is claimed is:

1. A wax-flux composition for use in a low-temperature soldering process, comprising:
    A. a major amount of a wax having an AMP of between 40°C and 100°C, and
    B. an amount effective to cause fluxing, at or below the soldering temperature of the piece to be soldered in said process of an amine salt of an alpha-bromo aliphatic carboxylic acid.

2. A wax-flux composition for use in a low-temperature soldering process, comprising:
    A. a major amount of a wax having an AMP between 40°C and 100°C, and
    B. an amount effective to cause fluxing, at or below the soldering temperature, of the piece to be soldered in said process of a primary or secondary amine salt of an alpha-bromoaliphatic hydrocarbyl carboxylic acid.

3. A wax-flux composition of claim 2 wherein said amine salt is a primary or secondary hydrocarbyl amine salt of an alpha-bromo-aliphatic hydrocarbyl carboxylic acid.

4. A wax-flux composition of claim 3 wherein the amine of said amine salt contains 6 to 40 carbon atoms and the hydrocarbyl group of said acid contains 5 to 21 carbon atoms.

5. A wax-flux composition for use in a low-temperature soldering process, comprising:
    A. a major amount of a wax having an AMP of between 40°C and 100°C, and
    B. an amount effective to cause fluxing, at or below the soldering temperature, of the piece to be soldered in said process of an amine salt of an alpha-bromo-aliphatic carboxylic acid of the following formula:

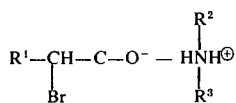

wherein:
1. $R^1$ represents an aliphatic hydrocarbyl containing 4 to 20 carbon atoms and 0 to 2 sites of olefinic unsaturation; and
2. $R^2$ and $R^3$ each independently represent hydrogen or a hydrocarbyl such that the sum of the carbon atoms contained in $R^2$ and $R^3$ is between 6 and 40.

6. A wax-flux composition of claim 5 wherein (a) $R^1$ represents an aliphatic hydrocarbon containing 12 to 18 carbon atoms and 0 to 1 site of olefinic unsaturation, and (b) $R^2$ and $R^3$ each independently represent hydrogen or an aliphatic hydrocarbyl containing 3 to 16 carbon atoms.

7. A wax-flux composition of claim 6 wherein $R^2$ and $R^3$ each independently represent an aliphatic hydrocarbyl containing 3 to 16 carbon atoms.

8. A wax-flux composition of claim 6 wherein $R^2$ and $R^3$ each independently represent an aliphatic hydrocarbyl containing 6 to 10 carbon atoms.

9. A wax-flux composition of claim 6 wherein $R^2$ and $R^3$ each represent 2-ethylhexyl.

10. A wax-flux composition of claim 6 wherein $R^2$ and $R^3$ each represent hexyl.

11. A wax-flux composition of claim 6 wherein $R^2$ and $R^3$ each represent octyl.

12. A wax-flux composition of claim 1 containing 1 to 20 weight percent of said amine salt.

13. A wax-flux composition of claim 4 containing 1 to 20 weight percent of said amine salt.

14. A wax-flux composition of claim 5 containing 1 to 20 weight percent of said amine salt.

15. A wax-flux composition of claim 5 containing 3 to 12 weight percent of said amine salt.

16. A wax-flux composition of claim 7 containing 1 to 20 weight percent of said amine salt.

17. A wax-flux composition of claim 7 containing 3 to 12 weight percent of said amine salt.

18. A wax-flux composition of claim 9 containing 3 to 12 weight percent of said amine salt.

19. A wax-flux composition of claim 10 containing 3 to 12 weight percent of said amine salt.

20. A wax-flux composition of claim 11 containing 3 to 12 weight percent of said amine salt.

* * * * *